United States Patent Office 3,141,023
Patented July 14, 1964

3,141,023
CERTAIN N-CARBAMYLURAZOLES
Euclid W. Bousquet, Wilmington, Del., assignor to E. I. du Pont de Nemours and Company, Wilmington, Del., a corporation of Delaware
No Drawing. Filed Aug. 23, 1961, Ser. No. 133,312
5 Claims. (Cl. 260—308)

This invention relates to new heterocyclic compounds and particularly to urazoles having at least one carbamyl group on nuclear nitrogen.

Heterocyclic compounds have achieved considerable importance in industrial and biological applications. Of those having nuclear nitrogens, certain triazoles and especially urazoles have been found to have a particularly stable ring. Certain triazoles such as carbamyl guanazoles have been suggested for use in plastic manufacture. Although urazoles have received attention from a synthetic basis, those having a carbamyl group directly bonded to nuclear nitrogen have not heretofore been reported.

There have now been obtained new urazoles having the formula

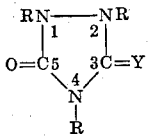

wherein at least one of the R groups is a carbamyl group of the structure

in which X is O, S, or $NR^3$, wherein $R^1$, $R^2$, and $R^3$ are hydrogen or hydrocarbon, and any remaining R is hydrogen, hydrocarbon, or oxygen-containing hydrocarbon, and Y is O or S. The preferred compounds are those having a total of up to 21 carbons in the R groups.

The new urazoles, i.e., 3,5-dioxo-1,2,4-triazolidines, having a carbamyl,

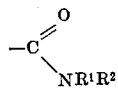

group on at least one of the nuclear nitrogens, can be obtained by reacting a urazole having at least one hydrogen on nuclear nitrogen with an isocyanic acid or an alkali metal cyanate, e.g., potassium cyanate, in the presence of acid. In this reaction, $R^1$ and $R^2$ are hydrogen in the carbamyl thus obtained. The reaction is generally carried out at relatively low temperature, e.g., 0–100° C., and preferably in an inert medium.

Thiocarbamyl compounds, i.e., urazoles having an

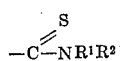

group attached to nuclear nitrogen, are obtained when an organic isothiocyante is employed in the reaction.

Also included in this invention are urazoles having as an R group the

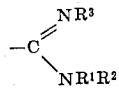

group. Such compounds can be obtained by the reaction of a urazole, having at least one nuclear hydrogen on nitrogen preferably in the 1- or 2-positions of the triazolidine nucleus, with a carbodiimide, a cyanamide, or an isothiourea. In the case of the cyanamide, it is preferable to carry out the reaction in the presence of an acid medium at a pH of 2 to pH 4.

The following examples further illustrate the preparation and properties of these new urazoles.

EXAMPLE I

N-Carbamylurazole

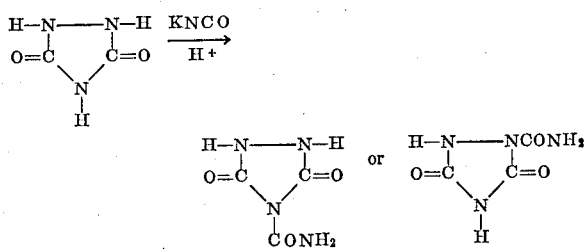

Urazole was prepared by the method of Gordon et al. [J. Org. Chem. 20, 604, (1953)], i.e., methyl allophanate was reacted with excess hydrazine to give the hydrazine salt of urazole which was converted to urazole by refluxing with acetone.

A solution of 75.7 g. (0.75 mole) of urazole was dissolved at 35–40° C. in 700 ml. of water. To this warm solution there was added a cold solution of 66.7 g. (0.825 mole) of potassium cyanate in 100 ml. of water. A white precipitate immediately formed with moderate evolution of heat. The reaction mixture was immediately cooled to 10° C. and 64 ml. (0.75 mole) of concentrated hydrochloric acid was then slowly added without any rise in reaction temperature. Subsequently, the reaction mixture was allowed to stand at room temperature for three hours. The white precipitate was filtered, washed thoroughly with warm water, and dried in a vacuum oven at 100° C. This crude N-carbamyl urazole, M.P. 240–242° C., amounted to 81.5 g. (75%). From the filtrate there was obtained, on chilling, an additional gram of N-carbamylurazole as shining white leaflets, M.P. 241–242° C.

*Analysis.*—Calcd. for $C_3H_4N_4O_3$: C, 24.99; H, 2.80; N, 38.89. Found: C, 24.94; H, 3.04; N, 38.88.

EXAMPLE II

1-Carbamyl-4-Phenylurazole

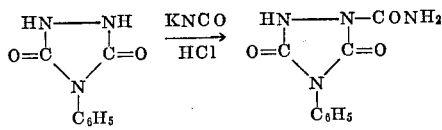

To 22.1 g. of 4-phenylurazole dissolved in 100 ml. of a mixture of ethyl alcohol/dimethylformamide/water (ratio of 50/10/40) and cooled to 5° C. was added 10.4 ml. of conc. HCl and 11.5 g. of potassium cyanate in 50 ml. of water. The reaction mixture was kept at 5–10° C. for several hours, then allowed to warm and stand at room temperature for 15 hours. The precipitate which formed was filtered, slurried in cold water, filtered and then slurried in ethyl alcohol and filtered. There was obtained 18.8 g. (68%) of 1-carbamyl-4-phenylurazole, M.P. 220° C. (with resolidification). Infrared spectrum shows the presence of an $NH_2$ group.

*Analysis.*—Calcd. for $C_9H_8N_4O_3$: C, 49.09; H, 3.64; N, 25.45. Found: C, 48.84; H, 3.92; N, 26.22.

EXAMPLE III

1-Carbamyl-4-Phenylurazole

An alternate method of the preparation of this compound (see Example II) is by use of isocyanic acid as follows: To 8.9 g. of 4-phenylurazole in 300 ml. of tetrahydrofuran cooled at between 0 and −10° C. was added 7.2 g. of liquid isocyanic acid. After an hour at this temperature, then two hours at 10–15° C., and two days at room temperature, the solvent was removed. The residue was slurried with ethanol, filtered, washed with water, and then with ethanol. The resulting white, glistening prisms of 1-carbamyl-4-phenylurazole amounted to 9 g. (82%). The product melts at 220° C. but resolidifies and then remelts at about 245–250° C.

*Analysis.*—Calcd. for $C_9H_8N_4O_3$: C, 49.09; H, 3.64; N, 25.45. Found: C, 49.00; H, 3.64; N, 25.58.

EXAMPLE IV

*1-Phenylcarbamyl-4-Phenylurazole*

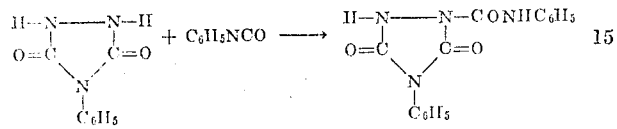

4-phenylurazole (4.5 g.) in 100 ml. of tetrahydrofuran was refluxed for four hours with 3 g. of phenylisocyanate. The solvent was then removed and the residue crystallized from ethyl alcohol to give 5.5 g. (74%) of white needles. M.P. 202–3° C. The infrared spectrum was consistent with the expected structure, 1-phenylcarbamyl-4-phenylurazole.

*Analysis.*—Calcd. for $C_{15}H_{12}N_4O_3$: C, 60.81; H, 4.05; N, 18.91. Found: C, 60.91; H, 4.19; N, 19.18.

EXAMPLE V

*1-Phenylthiocarbamyl-4-Phenylurazole*

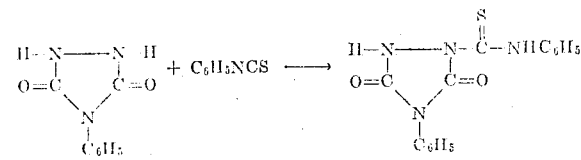

A mixture of 17.7 g. of 4-phenylurazole, 14.8 g. of phenylisothiocyanate, and 1 ml. of triethylamine in 100 ml. of dioxane was heated on a steam bath for two hours. The dioxane was removed and the residue was dissolved in ether, filtered, and cooled. The resulting gummy product was crystallized from alcohol to yield 1 g. of 1-phenylthiocarbamyl-4-phenylurazole, M.P. 166–7° C.

*Analysis.*—Calcd. for $C_{15}H_{12}N_4O_2S$: C, 57.69; H, 3.85; N, 17.95; S, 10.25. Found: C, 57.57; H, 4.13; N, 17.70; S, 10.28.

EXAMPLE VI

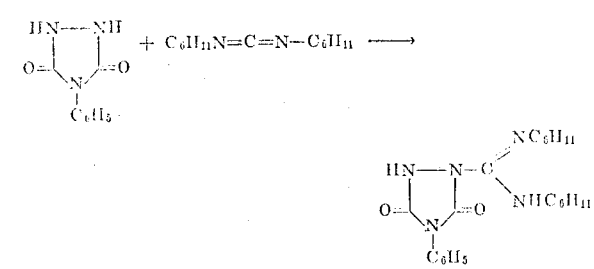

A solution of 5.5 g. (0.03 mm.) of 4-phenylurazole and 6.2 g. (0.03 m.) of dicyclohexylcarbodiimide in 100 ml. of tetrahydrofuran was refluxed for 15 hours. The pale yellow, gummy residue on evaporation of the solvent on the steam bath was then triturated with cold tetrahydrofuran to give 10 g. (87%) of a white solid which was filtered and washed several times with tetrahydrofuran. This crude product, soluble in chloroform and alcohol, melted at 217–9° C. Crystallization from tetrahydrofuran yielded 1-(N,N'-dicyclohexylguanyl)-4-phenylurazole, M.P. 218–9° C. (Fischer block).

*Analysis.*—Calcd. for $C_{21}H_{29}N_5O_2$: N, 18.22. Found: N, 18.31, 18.58.

EXAMPLE VII

*1,2-Di(N,N-Dimethylcarbamyl)-4-Cyclohexylurazole*

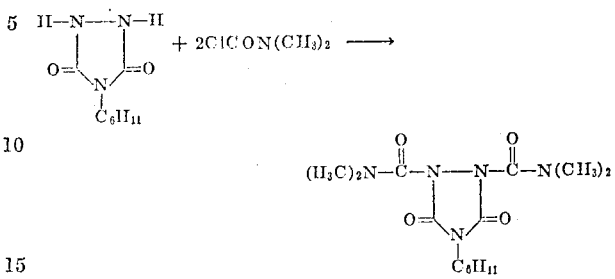

To a solution of 27.5 g. of 4-cyclohexylurazole in 200 ml. of dry tetrahydrofuran was added slowly 40.0 g. of N,N-dimethylcarbamyl chloride, and, dropwise, with stirring, 37.8 g. of triethylamine. The mixture was refluxed for four hours, cooled by ice, and the precipitated salt filtered and washed first with tetrahydrofuran and then with ether. The filtrate was evaporated and the residue diluted with water and ammonium hydroxide added to a pH of 9 to dissolve monosubstitution product if present. After standing for one hour, the solid was filtered and washed with water to give 24 g. of product, M.P. 138–143° C. Recrystallization from methyl alcohol gave 14 g. of 1,2-di(N,N-dimethylcarbamyl)-4-cyclohexylurazole, M.P. 155–156° C.

*Analysis.*—Calcd. for $C_{14}H_{23}N_5O_4$: C, 51.69; H, 7.07; N, 21.53. Found: C, 52.06; H, 7.56; N, 21.93.

Repetition of the above general procedure except the dimethylcarbamyl chloride was added first to the mixture and the triethylamine then added dropwise was found preferable since heat of salt formation was reduced.

The 4-cyclohexylurazole (M.P. 244–5°) was obtained by heating and stirring 65 g. of biuret with 75 g. of cyclohexylamine hydrochloride at 210–220° for 3.5 hours. Extraction of the cooled reaction mixture with ammonium hydroxide, filtration, acidification of alkaline extract gave the urazole, which on acetylation produced 1,2-diacetyl-4-cyclohexylurazole, M.P. 131–2° C.

EXAMPLE VIII

*1-N,N-Dimethylcarbamyl-4 - p-Ethoxyphenylurazole and 1,2-Di(N,N-Dimethylcarbamyl)- 4 - p-Ethoxyphenylurazole*

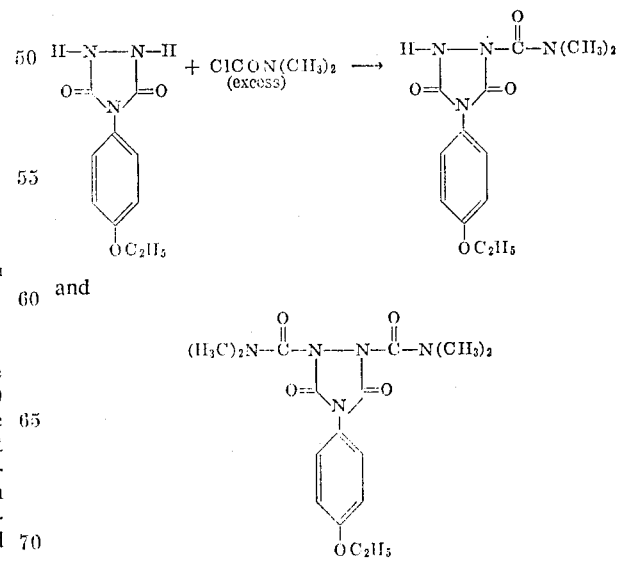

To a solution of 33.2 g. of 4-(p-ethoxyphenyl)urazole in 200 ml. of tetrahydrofuran was added 40.3 g. of N,N-dimethylcarbamyl chloride and 33.3 g. of triethylamine. After standing at room temperature for one hour, followed by refluxing for one-half hour, the precipitate which formed in the reaction mixture was filtered off and the filtrate set aside at room temperature for 6.5 hours. After an additional refluxing for one-half hour, the filtrate reaction mixture was cooled and the solid filtered and washed with water to give 25 g. of water and alkali-insoluble product. After recrystallization from ethyl alcohol, there was obtained the 1,2-di(N,N-dimethylcarbamyl)-4-(p-ethoxyphenyl)urazole, M.P. 247–249° C., as white crystals.

*Analysis.*—Calcd. for $C_{16}H_{21}N_5O_5$: C, 52.89; H, 5.79; N, 19.28. Found: C, 53.09; H, 4.79; N, 19.47.

After removal of the tetrahydrofuran from the filtrate, the residue was treated with cold dilute ammonium hydroxide and the resultant crude product filtered and washed with water. Recrystallization from ethyl alcohol gave an additional 6.5 g. of 1,2-di(N,N-dimethylcarbamyl)-4-(p-ethoxyphenyl)urazole.

The ammonium hydroxide wash liquid, on acidification, gave 2 g. of white solid, M.P. 158–165° C. This was redissolved in dil. ammonium hydroxide, filtered, and the product obtained on further acidification crystallized from a mixture of chloroform and petroleum ether to give 1 - N,N-dimethylcarbamyl - 4 - (p-ethoxyphenyl)urazole, M.P. 162.5–164° C.

*Analysis.* — Calcd. for $C_{13}H_{16}N_4O_4$: N, 19.17; $(CH_3)_2NH$, 15.41. Found: N, 19.06; $(CH_3)_2NH$, 15.20.

The dimethylamine, i.e., $(CH_3)_2NH$, content was obtained by alkaline hydrolysis.

The 4-(p-ethoxyphenyl)urazole employed in the preceding was obtained by reaction of 49 g. of p-ethoxyphenyl isocyanate with 31.2 g. of the ethyl ester of hydrazine carboxylic acid ($NH_2NHCOOEt$) in 200 ml. of tetrahydrofuran. The resultant compound, melting at 169–170° C., was added slowly to a stirred solution of 18.4 g. of potassium hydroxide in 160 ml. of water, maintaining the temperature at 45–55°. There was obtained after acidification 49 g. of 4-(p-ethoxyphenyl)urazole, which, on crystallization from methyl alcohol, and a melting point of 241–242.5° C.

*Analysis.*—Calcd. for $C_{10}H_{11}N_3O_3$: C, 54.30; H, 4.97; N, 19.00. Found: C, 54.54; H, 5.07; N, 19.03.

EXAMPLE IX

*1,2-Di(N,N-Dimethylcarbamyl)-4-Phenylurazole*

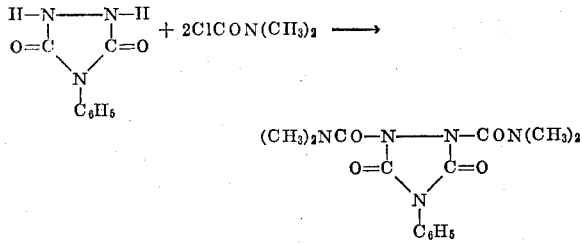

A mixture of 26 g. of 4-phenylurazole in 150 ml. of tetrahydrofuran, 38 g. of N,N-dimethylcarbamyl chloride, and 35.4 g. of triethylamine was refluxed for 4.5 hours, cooled, and filtered to yield 43 g. of solid. Of the latter, 20 g. was 1,2-di(N,N-dimethylcarbamyl)-4-phenylurazole and was insoluble in water and ammonium hydroxide. On treatment of the tetrahydrofuran filtrate with water, 17 g. of crude product was obtained from which an additional 7 g. of the 1,2-di(N,N-dimethylcarbamyl)-4-phenylurazole was obtained upon crystallization from methanal. The purified compound had a M.P. of 230–2°. The dimethylamine content obtained by alkaline hydrolysis was 28.97% (calculated 28.26%).

The same compound (having undepressed mixed M.P.) prepared under similar conditions had the following analysis:

*Analysis.*—Calcd. for $C_{14}H_{17}N_5O_4$: C, 52.67; H, 5.37; N, 21.93. Found: C, 53.32, 52.82; H, 5.54, 5.38; N, 22.10.

EXAMPLE X

*1-N,N-Dimethylcarbamyl-4-Phenylurazole*

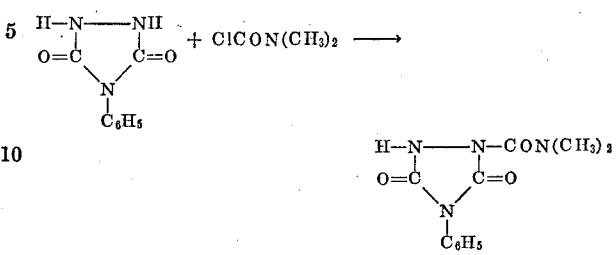

To a solution of 53 g. of 4-phenylurazole in 250 ml. of dry tetrahydrofuran and 38.7 g. of N,N-dimethylcarbamyl chloride was added 64 g. of triethylamine. After refluxing for five hours and cooling, a precipitate formed and was removed, and washed with dil. ammonium hydroxide. The insol. product was crystallized from tetrahydrofuran to give 7 g. of 1,2-di(N,N-dimethylcarbamyl)-4-phenylurazole, M.P. 230–2° (see preceding example). Acidification of the ammonium hydroxide extract with dil. hydrochloric acid yielded 15 g. of 1-N,N-dimethylcarbamyl-4-phenylurazole, M.P. 164–170°, which on crystallization from methanol had a M.P. of 180–1°. The dimethylamine content by alkaline hydrolysis was found to be 18.0% (calculated 18.14%).

*Analysis.*—Calcd. for $C_{11}H_{12}N_4O_3$: C, 53.22; H, 4.84. Found: C, 52.93; H, 4.92.

EXAMPLE XI

*1-Phenyl-2(4)-N,N-Dimethylcarbamylurazole and 1-Phenyl-2,4-Di(N,N-Dimethylcarbamyl)Urazole*

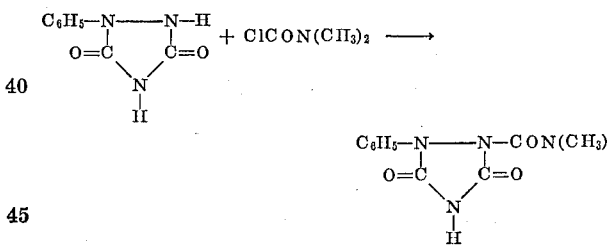

and/or

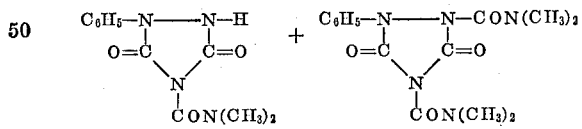

To a solution of 7.3 g. of 1-phenylurazole in 100 ml. of tetrahydrofuran was added 10.1 g. of triethylamine and 11 g. of N,N-dimethylcarbamyl chloride. The mixture was refluxed with stirring for seven hours and allowed to stand at room temperature for 2½ days. The solid in the reaction mixture was removed by filtration and washed with tetrahydrofuran to give 6.4 g. of triethylamine hydrochloride. The filtrate was evaporated and the solid washed with water and then with dilute ammonium hydroxide. The solid product was filtered and washed with water to give 3.2 g. of material, M.P. 129–131° C. This was recrystallized from methanol to give 1-phenyl-2,4-di(N,N-dimethylcarbamyl)urazole melting at 132–133° C.

*Analysis.* — Calcd. for $C_{14}H_{17}N_5O_4$: N, 21.94; $(CH_3)_2NH$, 28.21. Found: N, 21.99; $(CH_3)_2NH$, 27.11.

Upon acidification of the ammonium hydroxide treated filtrate above, a white precipitate (2.5 g.) formed which on crystallization from diluted methanol melted at 167–8° C. and consisted of 1-phenyl-2(4)-N,N-dimethylcarbamylurazole.

EXAMPLE XII

*1-N,N-Dimethylcarbamyl-4-Phenyl-3(5)-Thioxourazole*

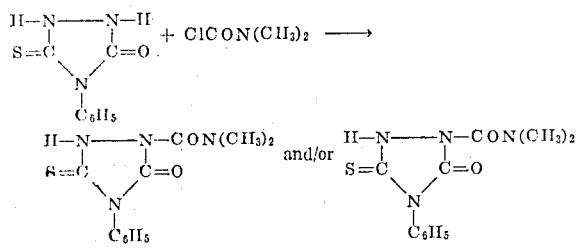

To a solution of 19.3 g. of 4-phenyl-3-thioxourazole in 150 ml. of tetrahydrofuran was added 22.2 g. of triethylamine and 27 g. of N,N-dimethylcarbamyl chloride. The mixture was refluxed for two hours. The precipitate (30 g.) which formed was removed by filtration from the cooled mixture and was washed with tetrahydrofuran. Washing with water left 19 g. of insoluble product which was crystallized from dilute methanol. The 1-N,N-dimethylcarbamyl-4-phenyl-3(5)-thioxourazole melted at 217–218° and was soluble in dil. ammonium hydroxide.

*Analysis.*—Calcd. for $C_{11}H_{12}N_4O_2S$: C, 50.00; H, 4.55; S, 12.12. Found: C, 49,76; H, 4.69; S, 11.86.

EXAMPLE XIII

*1,2-(4)-Di(N,N-Dimethylcarbamyl)Urazole*

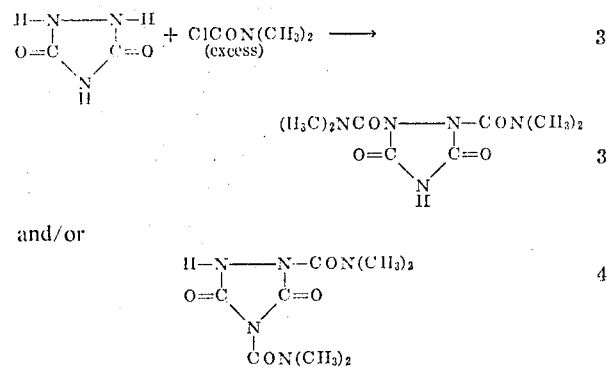

and/or

To a suspension of 13.5 g. of urazole in 100 ml. of dimethylformamide was added 49.4 g. of N,N-dimethylcarbamyl chloride and then 46 g. of triethylamine slowly introduced. After standing at room temperature for one-half hour, a small amount of gummy material formed. By warming on the steam bath to 50°, the reaction became exothermic to require cooling in ice. After standing for 15 hours, the reaction mixture was warmed on a steam bath for one hour, then cooled to 10°, and filtered to remove triethylamine hydrochloride. The filtrate was extracted with two 100-ml. portions of ether and the insoluble viscous oil separated and dissolved in 20 ml. of ethyl alcohol. On cooling in ice, 2 g. of 1,2-di(N,N-dimethylcarbamyl)urazole (or its isomer), M.P. 248–250°, was removed by crystallization.

*Analysis.*—Calcd. for $C_8H_{13}N_5O_4$: N, 28.80; $(CH_3)_2NH$, 37.03. Found: N, 29.66; $(CH_3)_2NH$, 37.51.

EXAMPLE XIV

*1,2-Di(N,N-Dimethylthiocarbamyl)-4-Phenylurazole*

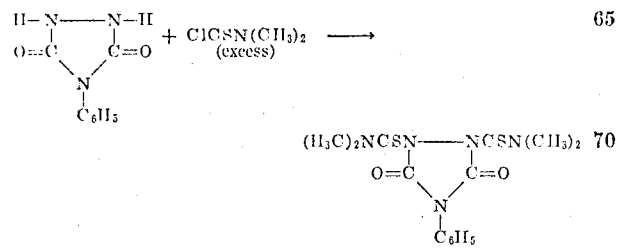

To a solution of 22.2 g. of 4-phenylurazole in 150 ml. of dry tetrahydrofuran was added successively 37.2 g. of N,N-dimethylthiocarbamyl chloride and 31.6 g. of triethylamine. The mixture, after standing at room temperature for three hours, was refluxed with stirring for four hours. The mixture was cooled and the solid (31 g.) filtered and washed with tetrahydrofuran. From this solid 1 g. of water-insoluble 4-phenylurazole was recovered. Evaporation of tetrahydrofuran from the filtrate gave a yellow residue which was triturated with methanol and poured into cold water to give a yellow solid. The latter was filtered, washed with water, and allowed to stand in dil. ammonium hydroxide. The resulting alkali insoluble solid (23.5 g.) was washed with methanol and crystallized from a mixture of chloroform/ethanol to give 1,2-di(N,N-dimethylthiocarbamyl)-4-phenylurazole, M.P. 247.5–249°.

*Analysis.*—Calcd. for $C_{14}H_{17}N_5O_2S_2$: S, 18.23. Found: S, 18.10.

EXAMPLE XV

*4-Methylphenyl-1,3-Bis(1,2-Di[N,N-Dimethylcarbamyl]-4-Urazole)*

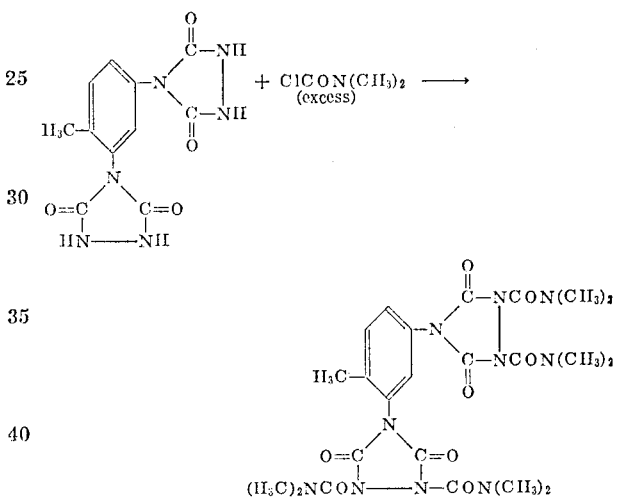

A mixture of 17.2 g. of 4-methylphenyl-1,3-bis(4-urazole), 31 g. of N,N-dimethylcarbamyl chloride and 27 g. of triethylamine in 200 ml. of tetrahydrofuran was refluxed with stirring for 50 hours. The residue obtained after evaporation of tetrahydrofuran was washed with water and gave 23 g. of product which appeared to melt above 300° C. (on a heated block with some melting and resolidification at 197–200°). The material was washed with dil. ammonium hydroxide and crystallized from ethanol to give 4-methylphenyl-1,3-bis(1,2-di[N,N-dimethylcarbamyl]-4-urazole), M.P. 194–7° with resolidification.

*Analysis.*—Calcd. for $C_{23}H_{30}N_{10}O_8$: N, 24.39; $(H_3C)_2NH$ 31.36. Found: N, 24.20; $(H_3C)_2NH$, 31.63.

The water-soluble starting bisurazole was prepared by reaction of tolylene diisocyanate in tetrahydrofuran portionwise with two moles of ethyl carbazate (ethyl ester of hydrazine carboxylic acid) below 25°. After removal of tetrahydrofuran there resulted 4-methylphenyl-1,3-bis-(3-carbethoxyaminourea), M.P. 155–160°.

*Analysis.*—Calcd. for $C_{15}H_{22}N_6O_6$: C, 47.12; H, 5.76; N, 22.00. Found: C, 47.29; H, 6.01; N, 22.13.

When the preceding compound (49.7 g.) was added slowly to a stirred solution of 17.5 g. of potassium hydroxide in 100 ml. of water at 50° followed by cooling and acidification with removal of water, there was obtained the bisurazole, M.P. 256-7° (when dropped on a melting block heated to 255°).

New urazoles having a carbamyl, thiocarbamyl, or guanyl group on nuclear nitrogen are obtainable by reaction of a urazole having hydrogen on nuclear nitrogen with an appropriate reagent, i.e., isocyanate, isothiocyanate, carbamyl chloride, thiocarbamyl chloride, cyanamide, isothiourea, or carbodiimide. This reaction is generally carried out in an inert medium, i.e., a solvent for the urazole and reagent which does not react rapidly with either.

Included as starting materials for the preparation of the compounds of this invention are urazoles of the formula

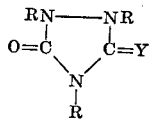

wherein at least one (and preferably two) of the R group(s) is hydrogen or hydrocarbon and the remaining groups are hydrogen or hydrocarbon, and Y is O. (See Journal of the American Pharmaceutical Association 48, 123, 671 (1959).) The latter hydrocarbon groups include aliphatic, cycloaliphatic, and aromatic hydrocarbons of up to 13 carbons for an R group of the initial urazole. Hydrocarbon monoradicals for $R^1$, $R^2$, or $R^3$ (guanyl) include methyl, ethyl, butyl, n-octyl, n-decyl, n-dodecyl, allyl, 2-butenyl, cyclopentyl, cyclohexyl, phenyl, p-tolyl, diphenylmethyl, and benzyl. Also useful, and in some cases actually preferred for some uses, are radicals which are hydrocarbon except for inert hydrophilic groups, particularly oxygen-containing groups as in methoxyphenyl. Also included are the thioxourazoles, i.e., those in which Y is S as further illustrated by Example XII.

Suitable solvents are those dissolving appreciable amounts of the urazole and reagent. These vary with the urazole employed and the specific reagent. Solvents included as generally useful are dimethylformamide, dimethylacetamide, tetrahydrofuran, acetonitrile, dimethyl ether of ethylene glycol, benzonitrile, etc. These solvents either do not react with isocyanates or react at a lower rate than the latter react with urazoles.

Reagents useful to replace hydrogen on nuclear nitrogen of a urazole with a carbamyl, thiocarbamyl, or guanyl group are isocyanates, isothiocyanates, carbamyl halides, isothioureas, cyanamides, and carbodiimides. Representative compounds of these classes include isocyanic acid, alkali metal cyanates, o-tolyl isocyanate, α-naphthyl isothiocyanate, n-butyl isocyanate, cyclohexyl isocyanate, p-methoxyphenylisocyanate, N-naphthylcarbamyl chloride, N-phenylcarbamyl chloride, N-piperidine carbonyl chloride, N-pyrrolidine carbonyl chloride, diethylcarbamyl chloride, methylethylcarbamyl chloride, di-p-tolyl carbodiimide, cyanamide, methyl cyanamide, ethylcyanamide, phenylcyanamide, benzylcyanamide, S-methylisothiourea, S-butylisothiourea, and the like.

This reaction does not require unusual conditions. Times of 1 to 24 hours are generally sufficient at temperatures of −30 to 100° C. The presence of an acid acceptor, e.g., a tertiary amine, is helpful many times, particularly when a carbamyl halide is used, under which reaction conditions it is present in sufficient amounts to react with all hydrogen halide produced.

The carbamyl-containing urazoles of this invention are generally white crystalline materials generally melting above 150° C. They are generally soluble in hydroxylated solvents such as alcohol, and in some cases water.

The new urazoles of this invention are useful as biological agents. For example, they will kill nematodes. When incorporated in the soil at rates in the range of 50 to 100 p.p.m., the compound of Example I kills the larvae of the root knot nematode.

New products of this invention are useful in treating cellulosic fabrics to improve their launderability, crease retention, etc. Thus, superior textile products are available by coating the fibers with the reaction product of formaldehyde or furfural with carbamyl urazoles having hydrogen on nitrogen, followed by a heat treatment.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

I claim:
1. A compound of the formula

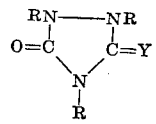

wherein Y is of the class consisting of oxygen and sulfur; at least one R is a carbamyl group of the structure

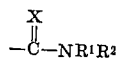

in which X is of the class consisting of oxygen, sulfur and $=NR^3$; $R^1$, $R^2$, and $R^3$ are each selected from the group consisting of hydrogen and hydrocarbyl of up to 13 carbon atoms; and any remaining R's are selected from the group consisting of hydrogen, hydrocarbyl of up to 13 carbon atoms, p-ethoxyphenyl and p-methoxyphenyl.

2. 1-carbamyl-4-phenylurazole.
3. 1-phenylcarbamyl-4-phenylurazole.
4. 1-phenylthiocarbamyl-4-phenylurazole.
5. 1,2-di(N,N-dimethylcarbamyl)-4-phenylurazole.

References Cited in the file of this patent
FOREIGN PATENTS
1,104,965    Germany _____ June 18, 1959

OTHER REFERENCES

Degering: "An Outline of Organic Nitrogen Compd's," pp. 440, 445 (1945).

Wagner et al.: Synthetic Organic Chemistry (New York, 1953), pages 645, 647.

Degering: Op. cit., pages 425–8, 438–9, 465–6.

Henry et al.: J. Am. Chem. Soc., vol. 71, pages 2297–2300 (1949).